(12) United States Patent
Chang

(10) Patent No.: US 10,399,152 B2
(45) Date of Patent: Sep. 3, 2019

(54) POCKET HOLE JIG

(71) Applicant: Woodfox tools Co., Ltd, Taichung (TW)

(72) Inventor: Chao-Chuan Chang, Taichung (TW)

(73) Assignee: Woodfox tools Co., Ltd, Taichung (TW)

( * ) Notice: Subject to any disclaimer, the term of this patent is extended or adjusted under 35 U.S.C. 154(b) by 0 days.

(21) Appl. No.: 15/835,440

(22) Filed: Dec. 7, 2017

(65) Prior Publication Data
US 2019/0176247 A1 Jun. 13, 2019

(51) Int. Cl.
*B23B 47/28* (2006.01)

(52) U.S. Cl.
CPC ............ *B23B 47/287* (2013.01); *B23B 47/28* (2013.01); *B23B 2247/10* (2013.01); *B23B 2247/12* (2013.01); *Y10T 408/569* (2015.01)

(58) Field of Classification Search
CPC ........................ Y10T 408/567; Y10T 408/569; B23B 47/28; B23B 47/287; B23B 47/288; B23B 2247/10
See application file for complete search history.

(56) References Cited

U.S. PATENT DOCUMENTS

| | | | | |
|---|---|---|---|---|
| 4,952,101 A * | 8/1990 | Coombs | ................ | B23B 47/287 33/667 |
| 5,056,966 A * | 10/1991 | Lee | ....................... | B23B 47/287 408/115 R |
| 6,481,937 B1 * | 11/2002 | Sommerfeld | ......... | B23B 47/287 408/103 |
| 7,641,425 B2 * | 1/2010 | Sommerfeld | ......... | B23B 47/287 269/224 |
| 9,682,430 B2 * | 6/2017 | Clark | ....................... | B23B 47/00 |
| 2005/0089381 A1 * | 4/2005 | Liu | ....................... | B23B 47/287 408/115 R |
| 2008/0075546 A1 * | 3/2008 | Lin | ....................... | B23B 47/287 408/115 R |
| 2008/0099101 A1 * | 5/2008 | Chiang | ................ | B23B 47/287 144/2.1 |
| 2008/0226406 A1 * | 9/2008 | Chiang | ................ | B23B 47/287 408/115 R |
| 2014/0341665 A1 * | 11/2014 | Clark | ................ | B23Q 11/0042 408/67 |

* cited by examiner

*Primary Examiner* — Sunil K Singh
*Assistant Examiner* — Yasir A Diab

(57) ABSTRACT

A pocket hole jig in contains: a base, a first fixing assembly, a drilling assembly, and a second fixing assembly. The first fixing assembly and the drilling assembly are arranged on two ends of the base respectively, and an operation space is defined between the first fixing assembly and the drilling assembly of the base so as to accommodate a wooden workpiece. The first fixing assembly includes a push rod, the drilling assembly includes at least one tilted orifice, wherein an inlet segment of the at least one tilted orifice is located on an upper end of the drilling assembly, and an outlet segment of the at least one tilted orifice is located on one side of the drilling assembly. The second fixing assembly is located on one side of the base and includes an abutting seat configured to abut against the wooden workpiece.

10 Claims, 6 Drawing Sheets

POCKET HOLE JIG

FIELD OF THE INVENTION

The present invention relates to a pocket hole jig which is applied to drill oblique holes at a specific angle on a wooden workpiece and is capable of adjusting a drilling position quickly based on a thickness of the wooden workpiece and a size of a screw.

BACKGROUND OF THE INVENTION

A conventional drill tool is employed to manually drill holes on a wooden workpiece, but it is easy to cause an offset drilling path.

A conventional drill mold contains a guide column having a body, and the body has a datum plane defined on a bottom thereof so as to abut against the wooden workpiece. The body has a tilted face and a recess which are formed on a front end of the body, wherein the recess obliquely extends to the datum plane of the body downward from the tilted face, wherein the tilted face has a guiding sleeve removably fitted thereon, and the guiding sleeve is configured to guide a drill head so as to drill a bevel orifice on a workpiece via the recess. The body also has an abutting face formed on a rear end thereof and perpendicular to the datum plane, when the abutting face aligns with an edge of the workpiece, a central line of the drill head aligns with a center of a thickness of the workpiece, and the abutting face has an accommodation aperture extending along the body so as to accommodate extension blocks of various sizes, thus changing s horizontal distance between the guide column and the edge of the workpiece. The extension block has a connection post extending from one end thereof contacting with the abutting face, wherein when the extension block connects with the body, the connection post accommodates in the accommodation aperture of the body.

However, the conventional drill mold mates with extension blocks of various sizes to cause using inconvenience.

The present invention has arisen to mitigate and/or obviate the afore-described disadvantages.

SUMMARY OF THE INVENTION

The primary aspect of the present invention is to provide a pocket hole jig which is applied to drill oblique holes at a specific angle on a wooden workpiece and is capable of adjusting a drilling position quickly based on a thickness of the wooden workpiece and a size of a screw.

To obtain the above mentioned aspect, a pocket hole jig provided by the present invention contains: a base, a first fixing assembly, a drilling assembly, and a second fixing assembly.

The base is a flat plate, and the first fixing assembly and the drilling assembly are arranged on two ends of the base respectively, wherein an operation space is defined between the first fixing assembly and the drilling assembly of the base so as to accommodate a wooden workpiece.

The first fixing assembly includes a push rod configured to abut against the wooden workpiece and to mate with the drilling assembly.

The drilling assembly includes at least one tilted orifice configured to guide a drill bar, wherein an inlet segment of the at least one tilted orifice is located on an upper end of the drilling assembly, and an outlet segment of the at least one tilted orifice is located on one side of the drilling assembly.

The second fixing assembly is located on one side of the base and includes an abutting seat configured to abut against the wooden workpiece.

Preferably, the drilling assembly includes two upright mounts and a slider, the two upright mounts are fixed on the base and includes two sliding rails arranged on two opposite side surfaces of the two upright mounts respectively, and the slider has two dovetail grooves arranged on two sides of the two sliding rails individually, wherein the two upright mounts have two screw rods respectively, each of the two screw rods has a control disc located outside an outer wall of each of the two upright mounts, each screw rod has an affix disc corresponding to each of the two dovetail grooves, and the at least one tilted orifice is defined on the slider.

Preferably, each upright mount has a coordinate formed thereon, and the slider has a size indication configured to align with the coordinate, the base includes a removable rotation disc arranged in the operation space adjacent to the drilling assembly, wherein the removable rotation disc has multiple steps of different heights corresponding to the outlet segment of each dovetail groove after rotating.

Preferably, the slider further has a chip discharge aperture defined on one surface thereof and communicating with the at least one tilted orifice, and the slider has an exhaust pipe accommodated in the chip discharge aperture.

Preferably, the two upright mounts are removable from the base.

Preferably, the second fixing assembly includes two abutting seats and two connection posts secured on two sides of the base respectively, wherein the two connection posts insert through the two abutting seats individually, and the two abutting seats have two threaded bolts configured to screw with or unscrew from the two connection posts respectively.

Preferably, each of the two abutting seats has a longitudinal section, a lateral section configured to accommodate each of the two connection posts, a first through hole, and a second through hole communicating with and perpendicular to the first through hole.

Preferably, the base further includes a scale section proximate to the drilling assembly so as to measure a thickness of the wooden workpiece.

Preferably, the base further includes a connection slot formed on a bottom thereof.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
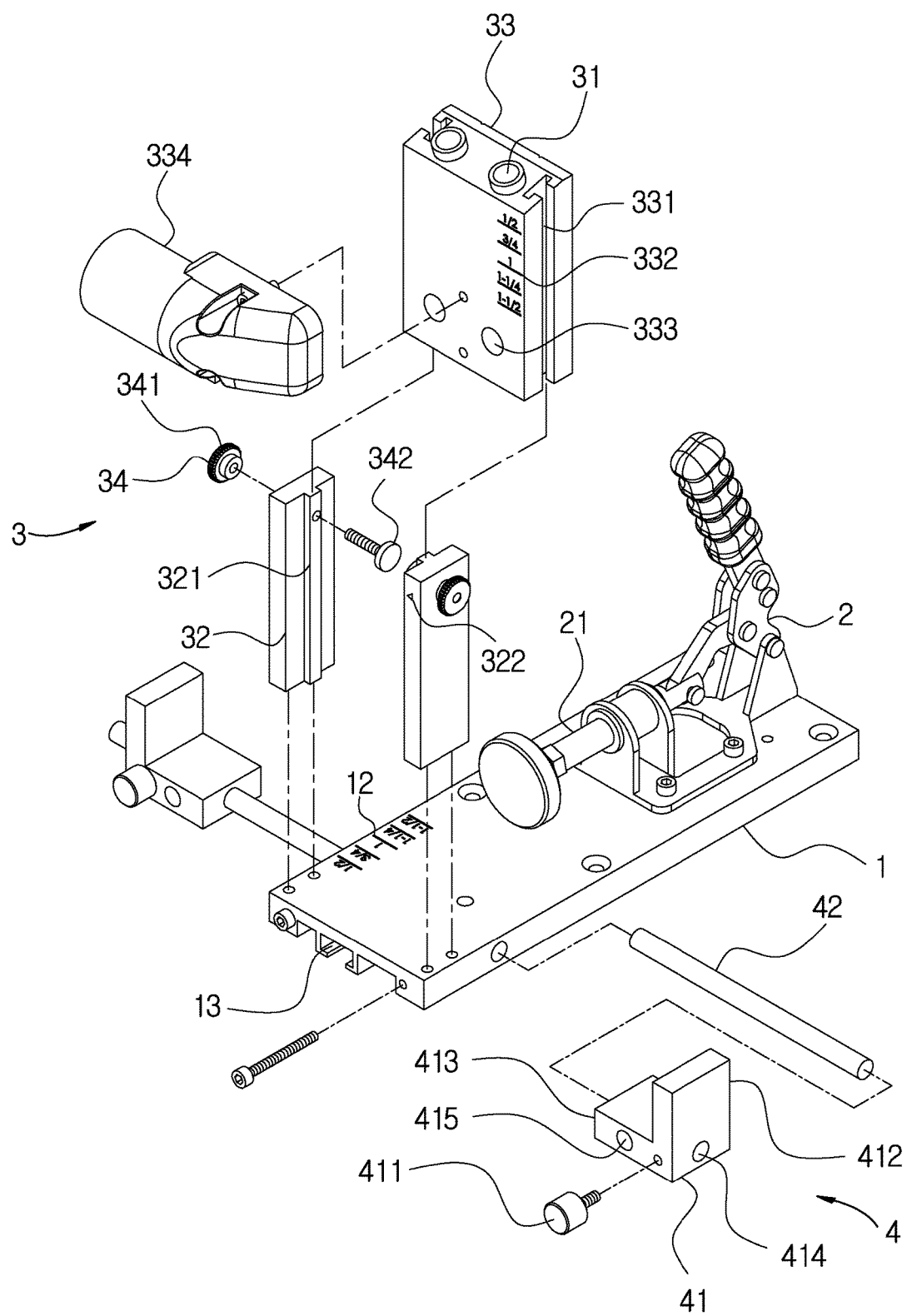
FIG. 1 is a perspective view showing the exploded components of a pocket hole jig according to a preferred embodiment of the present invention.
Figure 2:
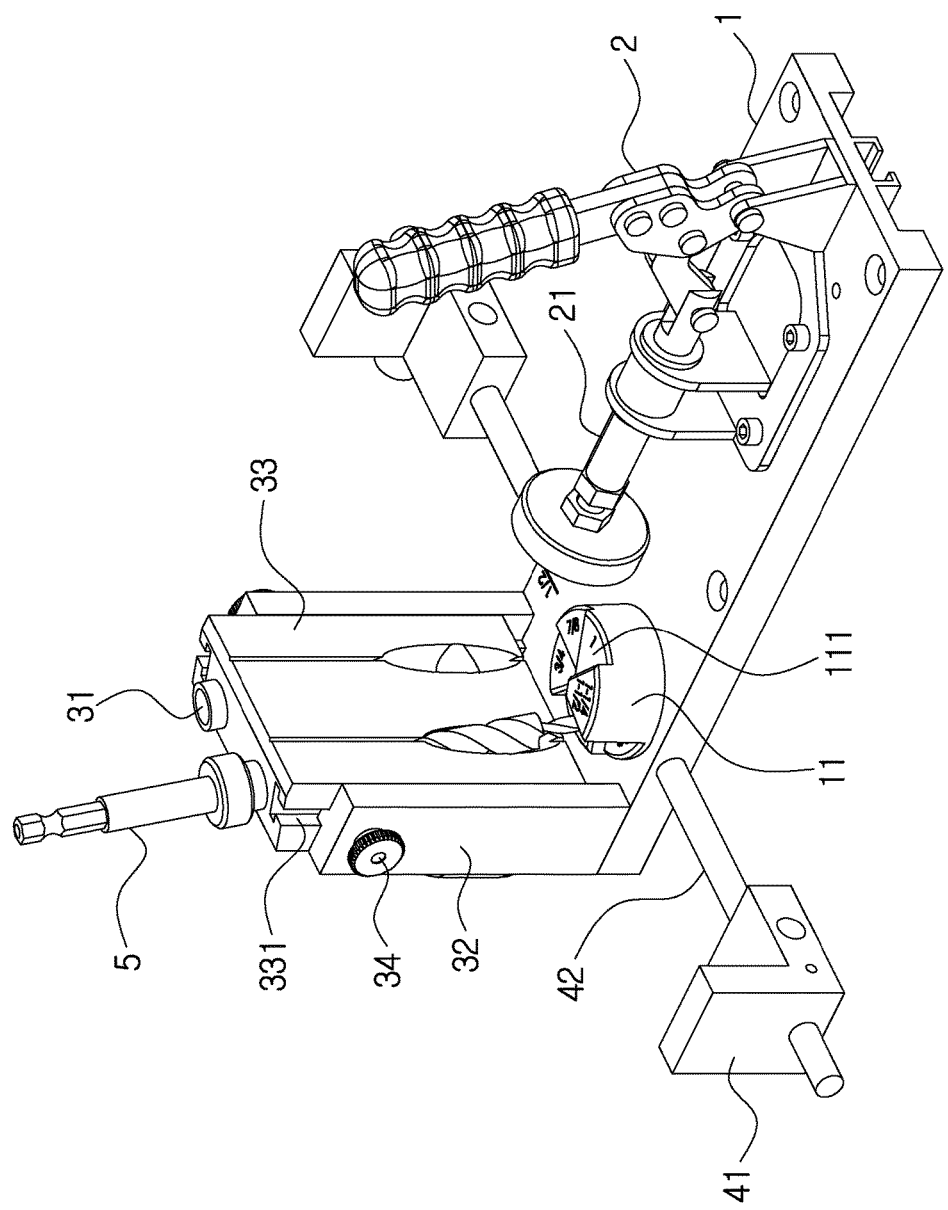
FIG. 2 is a perspective view showing the operation of the pocket hole jig according to the preferred embodiment of the present invention.
Figure 3:
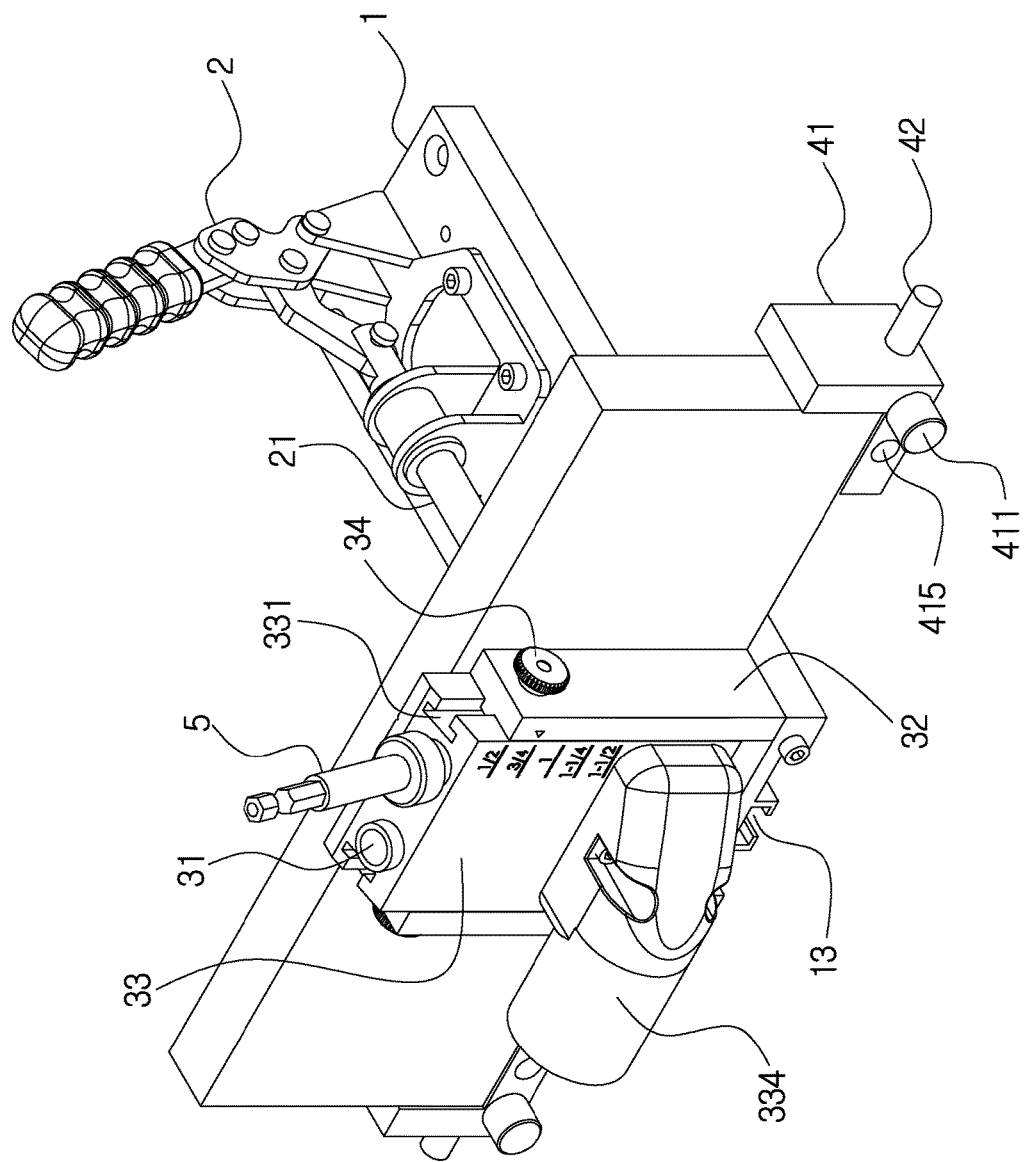
FIG. 3 is another perspective view showing the operation of the pocket hole jig according to the preferred embodiment of the present invention.

With reference to FIGS. 1-3, a pocket hole jig in accordance with a preferred embodiment of the present invention is applied to drill oblique holes at a specific angle on a wooden workpiece and is capable of adjusting a drilling position quickly based on a thickness of the wooden workpiece and a size of a screw. The pocket hole jig of the present invention comprises: a base 1, a first fixing assembly 2, a drilling assembly 3, and a second fixing assembly 4.

The base 1 is a flat plate, and the first fixing assembly 2 and the drilling assembly 3 are arranged on two ends of the base 1 respectively, wherein an operation space is defined between the first fixing assembly 2 and the drilling assembly 3 of the base 1 so as to accommodate the wooden workpiece.

The first fixing assembly 2 includes a push rod 21 configured to abut against the wooden workpiece and to mate with the drilling assembly 3, wherein the push rod 21 is a pneumatic push rod or an electric press bar.

The drilling assembly 3 includes at least one tilted orifice 31 configured to guide a drill bar 5, wherein an inlet segment of the at least one tilted orifice 31 is located on an upper end of the drilling assembly 3, and an outlet segment of the at least one tilted orifice 31 is located on one side of the drilling assembly 3 on which the wooden workpiece is clamped.

The second fixing assembly 4 is located on one side of the base 1 and includes at least one abutting seat 41 configured to abut against the wooden workpiece.

Referring to FIG. 3, the first fixing assembly 2 and the drilling assembly 3 clamp two ends of the wooden workpiece, and the at least one abutting seat 41 abuts against the wooden workpiece so that the wooden workpiece is mounted in the operation space of the base 1 securely, hence the at least one tilted orifice 31 guides the drill bar 5 so as to drill the oblique holes on the wooden workpiece.

The drilling assembly 3 includes two upright mounts 32 and a slider 33, wherein the two upright mounts 32 are fixed on the base 1 and includes two sliding rails 321 arranged on two opposite side surfaces of the two upright mounts 32 respectively, and the slider 33 has two dovetail grooves 331 arranged on two sides of the two sliding rails 321 individually, wherein the two upright mounts 32 have two screw rods 34 respectively, each of the two screw rods 34 has a control disc 341 located outside an outer wall of each of the two upright mounts 32, and each screw rod 34 has an affix disc 342 corresponding to each of the two dovetail grooves 331, and the at least one tilted orifice 31 is defined on the slider 33, such that a height of the slider 33 is adjusted relative to the two upright mounts 32 so as to change a drilling portion of the at least one tilted orifice 31 corresponding to the wooden workpiece. When each screw rod 34 is rotated tightly, the affix disc 342 is driven by each screw rod 34 so as to abut against each dovetail groove 331, thus fixing the slider 33. In contrast, when the each screw rod 34 is rotated loosely, the affix disc 342 is driven to remove from each dovetail groove 331, thus adjustably moving the slider 33.

Each upright mount 32 has a coordinate 322 formed thereon, and the slider 33 has a size indication 332 configured to align with the coordinate 322. The base 1 includes a removable rotation disc 11 arranged in the operation space adjacent to the drilling assembly 3, wherein the removable rotation disc 11 has multiple steps 111 of different heights corresponding to the outlet segment of each dovetail groove 331, hence the coordinate 322 corresponds to the size indication 332 so as to adjust the height of the slider 33. Preferably, the drill bar 5 drills the oblique holes at different heights by way of the multiple steps 111 of the removable rotation disc 11 (as shown in FIG. 2), after inserting each dovetail groove 331.

The slider 33 further has a chip discharge aperture 333 defined on one surface thereof and communicating with the at least one tilted orifice 31, and the slider 33 has an exhaust pipe 334 accommodated in the chip discharge aperture 333, hence chips are discharged out of the chip discharge aperture 333 of the slider 33 as drilling the oblique holes on the wooden workpiece, and the exhaust pipe 334 connects with an air exhauster so as to discharge the clips.

The second fixing assembly 4 includes two abutting seats 41 and two connection posts 42 secured on two sides of the base 1 respectively, wherein the two connection posts 42 insert through the two abutting seats 41 individually, and the two abutting seats 41 have two threaded bolts 411 configured to screw with or unscrew from the two connection posts 42 respectively, hence the two abutting seats 41 are adjustable relative to the base 1 so that the wooden workpiece is clamped firmly by the two abutting seats 41 before being drilled.

The two upright mounts 32 are removable from the base 1, and the drilling assembly 3 is removed from the base 1 easily.

Figure 4:
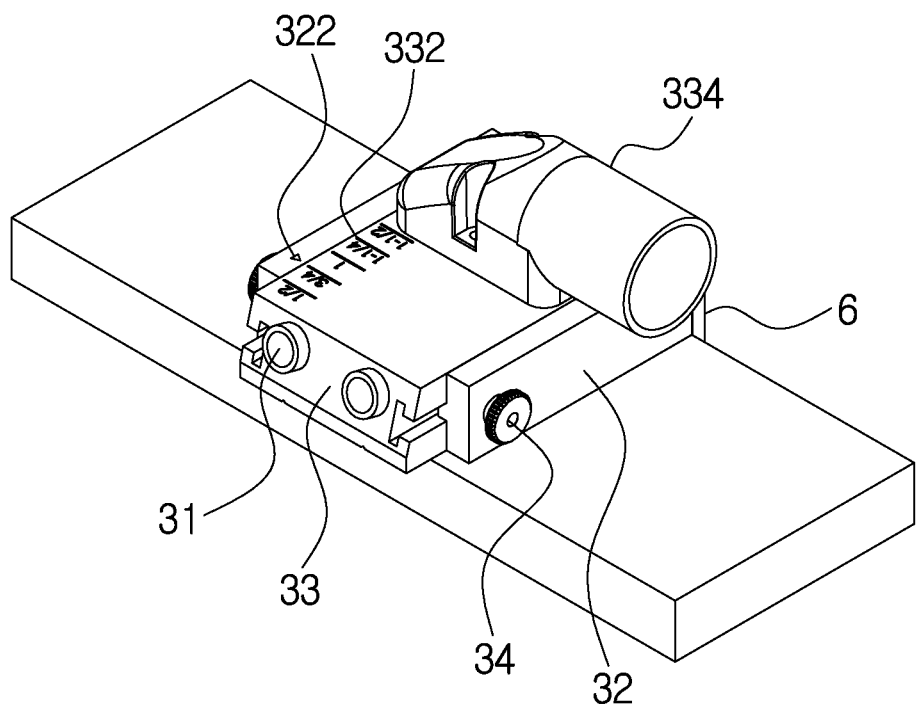
FIG. 4 is also another perspective view showing the operation of the pocket hole jig according to the preferred embodiment of the present invention.

As illustrated in FIG. 4, after removing the drilling assembly 3 from the base 1, the drilling assembly 3 mates with a locking plate 6 so as to drill the oblique holes.

The base 1 further includes a scale section 12 proximate to the drilling assembly 3 so as to measure the thickness of the wooden workpiece.

Figure 5:
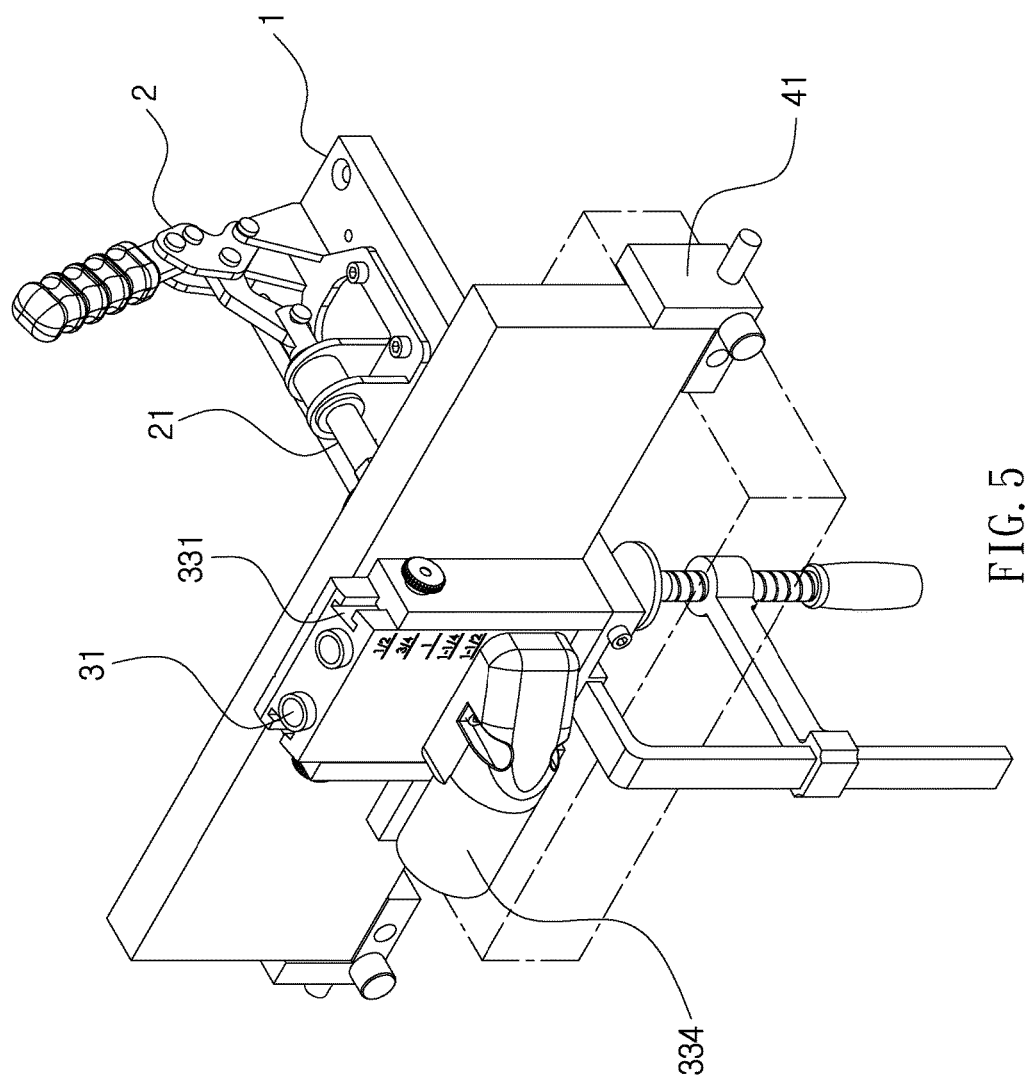
FIG. 5 is still another perspective view showing the operation of the pocket hole jig according to the preferred embodiment of the present invention.

The base 1 further includes a connection slot 13 formed on a bottom thereof. With reference to FIG. 5, the connection slot 13 is connected with a wood clamper so that the base 1 is fixed on a working stage by using the wood clamper.

Figure 6:
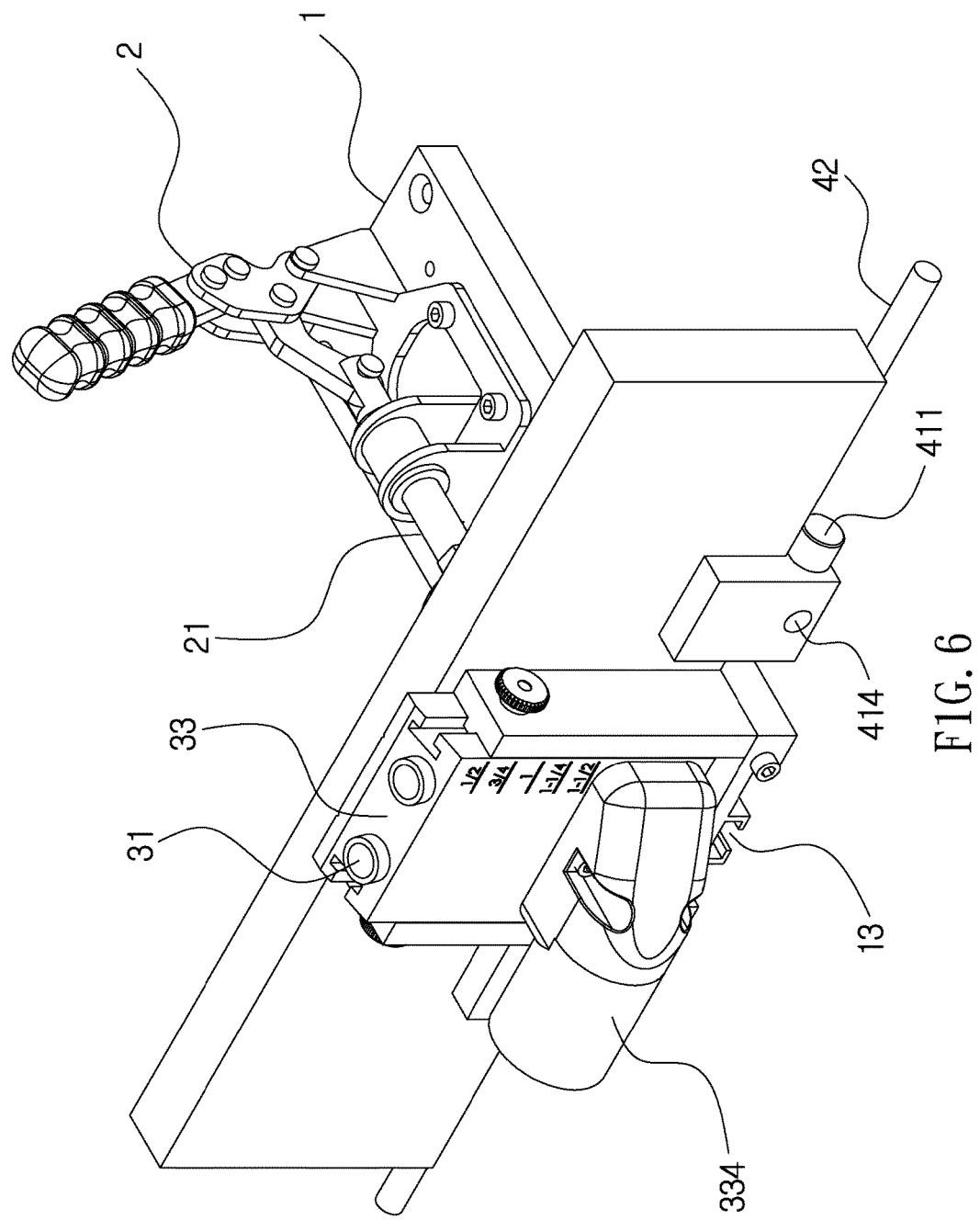
FIG. 6 is another perspective view showing the operation of the pocket hole jig according to the preferred embodiment of the present invention.

Each of the two abutting seats 41 has a longitudinal section 412, a lateral section 413 configured to accommodate each of the two connection posts 42, a first through hole 414, and a second through hole 415 communicating with and perpendicular to the first through hole 415. When each connection post 42 inserts into the first through hole 414, the longitudinal section 412 clamps the wooden workpiece. As shown in FIG. 6, when the wooden workpiece is too long to fix each abutting seat 41, each connection post 42 inserts into the second through hole 415 so that the longitudinal section 412 is parallel to the wooden workpiece so as to avoid a removal of each abutting seat 41 from each connection post 42.

Accordingly, the pocket hole jig of the present invention drills the oblique holes at the specific angle on the wooden workpiece accurately. The second fixing assembly 4 is configured to align with the drilling position of the wooden workpiece quickly. Preferably, the size indication 332 of the drilling assembly 3 is configured to align with the coordinate 322, hence a preferred drilling position is marked by the coordinate 322 quickly.

While various embodiments in accordance with the present invention have been shown and described, it is clear to those skilled in the art that further embodiments may be made without departing from the scope of the present invention.

What is claimed is:

1. A pocket hole jig comprising a base, a first fixing assembly, a drilling assembly, and a second fixing assembly, wherein:

the base is a flat plate, and the first fixing assembly and the drilling assembly are arranged on two ends of the base respectively, wherein an operation space is defined between the first fixing assembly and the drilling assembly of the base so as to accommodate a wooden workpiece;

the first fixing assembly includes a push rod configured to abut against the wooden workpiece and to mate with the drilling assembly;

the drilling assembly includes at least one tilted orifice configured to guide a drill bar, wherein an inlet segment of the at least one tilted orifice is located on an upper end of the drilling assembly, and an outlet segment of the at least one tilted orifice is located on one side of the drilling assembly; and the second fixing assembly is located on one side of the base and includes an abutting seat configured to abut against the wooden workpiece;

wherein the drilling assembly includes two upright mounts and a slider, the two upright mounts are fixed on the base and includes two sliding rails arranged on two opposite side surfaces of the two upright mounts respectively, and the slider has two dovetail grooves arranged on two sides of the two sliding rails individually, wherein the two upright mounts have two screw rods respectively, each of the two screw rods has a control disc located outside an outer wall of each of the two upright mounts, each screw rod has an affix disc corresponding to each of the two dovetail grooves, and the at least one tilted orifice is defined on the slider.

2. The pocket hole jig as claimed in claim 1, wherein each upright mount has a coordinate formed thereon, and the slider has a size indication configured to align with the coordinate, the base includes a removable rotation disc arranged in the operation space adjacent to the drilling assembly, wherein the removable rotation disc has multiple steps of different heights corresponding to the outlet segment of each dovetail groove after rotating.

3. The pocket hole jig as claimed in claim 1, wherein the slider further has a chip discharge aperture defined on one surface thereof and communicating with the at least one tilted orifice, and the slider has an exhaust pipe accommodated in the chip discharge aperture.

4. The pocket hole jig as claimed in claim 1, wherein the two upright mounts are removable from the base.

5. A pocket hole jig comprising a base, a first fixing assembly, a drilling assembly, and a second fixing assembly, wherein:

the base is a flat plate, and the first fixing assembly and the drilling assembly are arranged on two ends of the base respectively, wherein an operation space is defined between the first fixing assembly and the drilling assembly of the base so as to accommodate a wooden workpiece;

the first fixing assembly includes a push rod configured to abut against the wooden workpiece and to mate with the drilling assembly;

the drilling assembly includes at least one tilted orifice configured to guide a drill bar, wherein an inlet segment of the at least one tilted orifice is located on an upper end of the drilling assembly, and an outlet segment of the at least one tilted orifice is located on one side of the drilling assembly; and the second fixing assembly is located on one side of the base and includes an abutting seat configured to abut against the wooden workpiece;

wherein the second fixing assembly includes two abutting seats and two connection posts secured on two sides of the base respectively, wherein the two connection posts insert through the two abutting seats individually, and the two abutting seats have two threaded bolts configured to screw with or unscrew from the two connection posts respectively; and wherein each of the two abutting seats has a longitudinal section, a lateral section configured to accommodate each of the two connection posts, a first through hole, and a second through hole communicating with and perpendicular to the first through hole.

6. The pocket hole jig as claimed in claim 1, wherein the base further includes a scale section proximate to the drilling assembly so as to measure a thickness of the wooden workpiece.

7. The pocket hole jig as claimed in claim 1, wherein the base further includes a connection slot formed on a bottom thereof.

8. The pocket hole jig as claimed in claim 1, wherein the second fixing assembly includes two abutting seats and two connection posts secured on two sides of the base respectively, wherein the two connection posts insert through the two abutting seats individually, and the two abutting seats have two threaded bolts configured to screw with or unscrew from the two connection posts respectively.

9. The pocket hole jig as claimed in claim 5, wherein the base further includes a scale section proximate to the drilling assembly so as to measure a thickness of the wooden workpiece.

10. The pocket hole jig as claimed in claim 5, wherein the base further includes a connection slot formed on a bottom thereof.

* * * * *